United States Patent [19]

Schiettecatte et al.

[11] Patent Number: 5,295,431
[45] Date of Patent: Mar. 22, 1994

[54] CAPPUCCINO ACCESSORY

[75] Inventors: Patrice J. C. Schiettecatte; Justinus T. A. C. Paquay, both of Alencon, France

[73] Assignee: Moulinex (Societe Anonyme), Bagnolet, France

[21] Appl. No.: 15,862

[22] Filed: Feb. 10, 1993

[30] Foreign Application Priority Data

Feb. 10, 1992 [FR] France ................................ 92 01445

[51] Int. Cl.[5] .............................................. A47J 31/40
[52] U.S. Cl. ................................... 99/293; 99/323.1; 261/78.1; 261/DIG. 16; 261/DIG. 76
[58] Field of Search ............... 99/279, 300, 293, 295, 99/294, 323.1, 302 R, 299, 323.3; 261/78.1, DIG. 76, DIG. 16; 126/5; 426/433

[56] References Cited

U.S. PATENT DOCUMENTS

| | | | |
|---|---|---|---|
| 4,852,473 | 8/1989 | Bolivar | 99/293 |
| 4,852,474 | 8/1989 | Mahlich | 99/293 |
| 4,945,824 | 8/1990 | Borgmann | 99/293 |
| 4,960,042 | 10/1990 | Grossi | 261/DIG. 16 |

Primary Examiner—Robert W. Jenkins
Attorney, Agent, or Firm—Young & Thompson

[57] ABSTRACT

An accessory for the preparation of a creamy air-milk-steam emulsion to produce Italian cappuccino, is mounted at the end of a steam outlet pipe (2) of an espresso coffee machine. The accessory comprises an aspiration chamber (3) communicating with the steam outlet pipe, a first lateral opening (4) which communicates with a receptacle containing milk, a second lateral opening (5) in communication with the atmosphere, and a third opening (6) through which leaves a first mixture which flows into an emulsion chamber (7) having a first outlet (8). The accessory comprises a first rigid tubular member (9) having the first opening (4) and the first outlet (8) and receiving partially a second flexible tubular member (10) connected at its upper end to the steam outlet pipe (2) and comprising the aspiration chamber (3). The invention is applicable to all coffee machines with a steam outlet pipe.

9 Claims, 2 Drawing Sheets

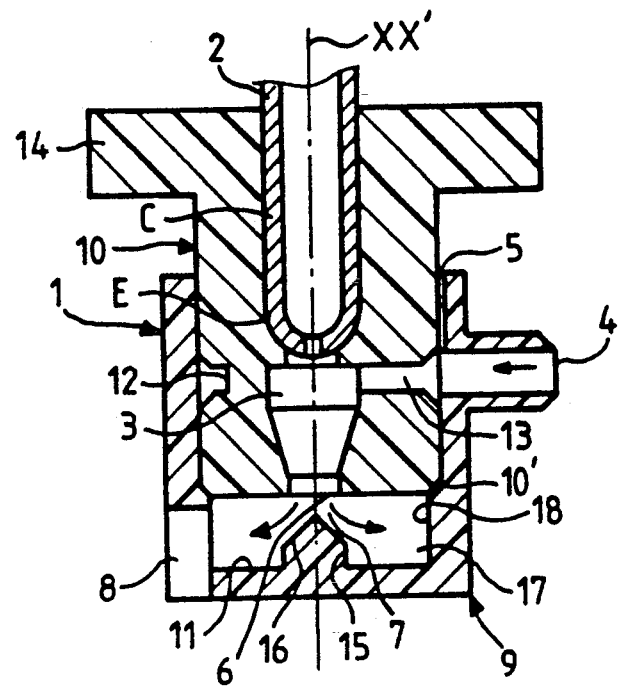
FIG_1
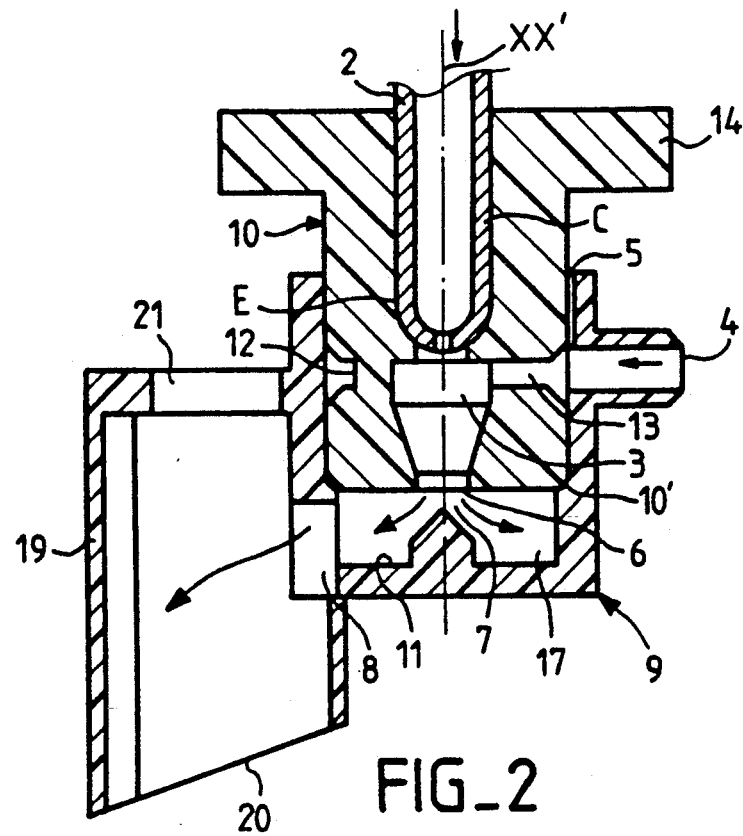
FIG_2

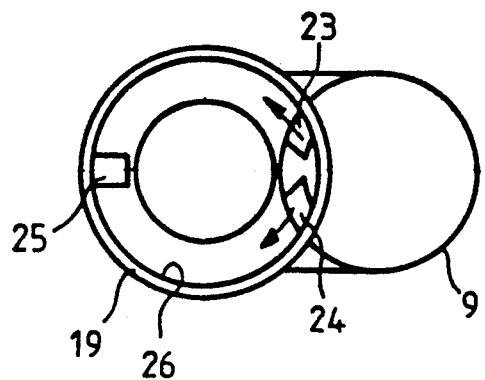
FIG_4
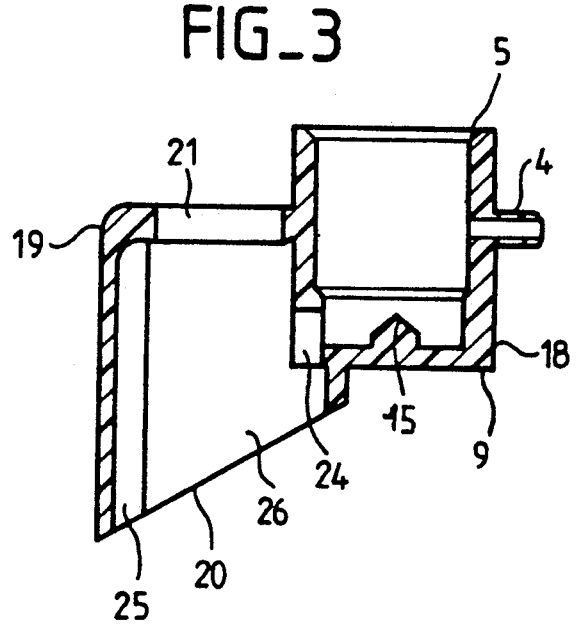
FIG_3

CAPPUCCINO ACCESSORY

FIELD OF THE INVENTION

The invention relates to an accessory adapted for the end of an output pipe for steam from an espresso coffee machine and permitting forming a creamy air-milk-steam emulsion necessary for the preparation of Italian "cappuccino". The accessory comprises an aspiration chamber connected with the steam output pipe, a first lateral opening which communicates with a receptacle containing milk, a second opening which communicates with the atmosphere, and a third opening by which a first mixture leaves, which flows into an emulsion chamber comprising a first flow means by which said creamy mixture escapes.

BACKGROUND OF THE INVENTION

Such accessories are well known and are described in numerous documents. One, described in a patent application EP 344,859, is constituted of several rigid pieces interconnected by joints, of anti-projection means and of means conveying air-milk-steam complexes. This accessory is cumbersome, difficult to emplace and remove and does not permit obtaining the maximum emulsion necessary for the obtention of a good "cappuccino". Moreover, the construction of such an accessory is not well adapted to mass production in which the pieces must be simple, and small in number, to permit automatic and economical assembly.

The object of the invention is to overcome the above drawbacks by providing a simple and economical accessory which will be easy to mount on the steam output pipe of an espresso coffee machine.

SUMMARY OF THE INVENTION

The invention has for its object an accessory for the preparation of cappuccino, comprising a first rigid tubular member having the first opening and the first flow means, and in which is partially sunk a second flexible tubular member connected at its upper end to the steam output pipe and comprising the aspiration chamber which is connected to the first opening and the second opening, the space remaining between the lower end of the second flexible tubular member and the base of the first rigid tubular member comprising the emulsion chamber.

Thanks to the invention, it will be understood that the construction of this accessory is particularly simple and economical because it consists in sinking the flexible member into the rigid member to obtain not only the connections between the chambers and openings, but also the seal between the members and between the steam outlet pipe and the flexible member. Moreover, such an accessory, because of its simplicity, is easily disassemblable, which improves its cleaning and guarantees correct reassembly by any user. Moreover, the direct connections between the openings and the chambers favor the creation of a creamy emulsion having an abundant foam of great fineness.

BRIEF DESCRIPTION OF THE DRAWINGS

The characteristics and advantages of the invention will become more apparent from the description which follows, by way of example, with reference to the accompanying drawings, in which:

FIG. 1 is a vertical cross section of a cappuccino accessory constituted by a rigid member and a flexible member according to a first embodiment;

FIG. 2 is a vertical cross section of a cappuccino accessory according to a second embodiment;

FIG. 3 is a vertical cross section of a rigid piece of a cappuccino accessory according to the invention;

FIG. 4 is a view from below of the accessory of FIG. 3.

DETAILED DESCRIPTION OF THE INVENTION

According to FIG. 1, an accessory 1 for the preparation of a creamy air-milk-steam emulsion to produce "cappuccino" is mounted at the end of a steam outlet pipe 2 of an espresso coffee machine (not shown). The accessory 1 comprises an aspiration chamber 3 which is in communication with: the steam outlet pipe 2, a first lateral opening 4 which communicates with a receptacle (not shown) containing milk, a second lateral opening 5 in communication with the atmosphere, and a third opening 6 through which exits a first air-milk-steam mixture which flows into an emulsion chamber 7 comprising a first flow means 8 through which the creamy emulsion escapes.

According to the invention, the accessory 1 comprises a first tubular rigid member 9 having the first opening 4 and the first flow means 8 and partially receiving a second flexible tubular member 10 of elastic material connected at its upper end to the steam outlet pipe 2. The second flexible tubular member 10 comprises the aspiration chamber 3 in communication with the first opening 4 and the second opening 5. The space left between the lower end of the second flexible tubular member 10 and the base 11 of the first rigid tubular member 9 comprises the emulsion chamber 7.

The steam outlet pipe 2 of the espresso coffee machine is sunk in a recess C, provided in the central portion of the second member 10, to come into abutment against a first shoulder E so as not to close the communication of the chamber 3 with the first lateral opening 4 by which the air-milk mixture arrives.

The internal wall 18 of the rigid member 9 comprises a shoulder 10' against which comes into abutment the end of the flexible member 10. In this way, the first rigid tubular member 9 ensures self-gripping on the second flexible tubular member 10 so as to guarantee a good seal between the various openings. The second flexible tubular member 10 also comprises a circular throat 12 recessed in its lateral surface, and into which opens a hole 13, for example, perpendicular to a longitudinal axis XX' of said second flexible tubular member 10, said throat 12 being closed by the internal wall 18 of the rigid wall 9 so as to place the aspiration chamber 3 in communication with the first opening 4. After complete insertion of the second tubular flexible member 10 into the first rigid tubular member 9, the circular throat 12 will be automatically in registry with the first opening 4 communicating with the receptacle containing the milk. To obtain an economical but reliable construction, the first rigid tubular member 9 is, for example, of polyacetaldehyde and the second flexible tubular member 10 is, for example, of silicone. All other flexible or rigid or heat-resistant material could similarly be used.

In the embodiment disclosed in FIG. 1, the second opening 5 serving as the air inlet is, for example, formed by a calibrated groove of a cross section between 0.1 and 0.3 mm$^2$, provided in the internal lateral wall 18 of the first rigid tubular member 9 and interrupting the contact surface between the two members 9 and 10.

The second opening 5 for air inlet can, in another embodiment (not illustrated), be provided in the second tubular member 10.

The upper end of the second flexible tubular member 10 comprises a gripping means, for example, an annular protuberance 14 provided at the external periphery of the upper end of the second member 10. This gripping means facilitates the mounting and unmounting of the accessory thus provided.

The base 11 of the first rigid tubular member 9 comprises a boss 15 situated facing the opening 6 and having at least one sharp edge, for example a conical point 16. This boss is followed by a zone 17 for the accumulation of creamy mixture which flows through the first flow means 8 constituted by at least one hole provided in the lateral wall 18.

The accessory thus disclosed is mounted on the steam outlet pipe 2 of an espresso coffee machine and can operate as soon as the steam valve of the machine is opened. In this way, the steam gushing from the pipe 2 aspirates and entrains, by the venturi effect, the air flowing from the second opening 5 and the milk flowing from the first opening 4 which communicates with a receptacle containing milk. A first air-milk-steam mixture forms in the aspiration chamber 3. The aspiration chamber 3 has, for example, an inverted truncated conical shape so as, on the one hand, to channel the first mixture against the boss 15 of the rigid member 10, and, on the other hand, to promote the aspiration into said chamber. Said first mixture is projected into the emulsion chamber 7 against the point of the cone 16 of the base 11 of the first rigid tubular member 9. Because of this, the stream of the first mixture is broken up into a multitude of droplets forming a new slender jet of large surface. This new jet strikes the base 11 of the lateral wall 18 of the first rigid tubular member 9 and mixes vigorously with a portion of the mixture already retained in the accumulation zone 17 so as to produce a good emulsion. In this way a creamy mixture comprised of a fine and abundant foam flows through the first flow means 8.

According to FIG. 2, in which certain references designate the same elements as those shown in FIG. 1, the accessory 1 for the preparation of a creamy mixture comprises at least one anti-splash means 19 positioned at the outlet of the first flow means 8. In another embodiment (not shown), two anti-splash means are secured on the rigid member 9 and thus permit obtaining a two-cup distributor. In the illustrated embodiment, the anti-splash means 19 is, for example, a cylindrical chamber integral with the first tubular rigid member 9. Said chamber 19 comprises an outlet opening for foam 20 through which escapes the creamy emulsion needed for cappuccino and positioned, for example, in the lower portion of said chamber 19 as well as an excess steam outlet opening 21 positioned, for example, in its upper part. The lower part of the outlet opening 20 has, for example, a shape that is cut off on the bias so as to promote good flow of the creamy emulsion to a single point.

According to FIGS. 3 and 4, in which certain reference numerals designate the same elements as those shown in FIG. 1, the first rigid tubular member 9 comprises, for example, two lateral holes 23 and 24 serving as flow means and oriented in a direction tangential to the internal side wall 26 of the chamber 19. The chamber 19 comprises a transverse lug 25 positioned on the interior of the lateral wall 26 of the chamber 19, extending substantially over all the height of the chamber 19 and disposed opposite the lateral holes 23 and 24. Thus, the creamy air-milk-steam mixture issuing from the oblique holes 23 and 24 follows a circular path shown by the arrows in FIG. 3, and strikes the lug 25. This creamy mixture flows along the lug 25 and is thus collected in a cup or any other receptacle without splashing. In this way, the movement imposed on the creamy mixture favors the separation of the steam from the creamy emulsion. Such an accessory also permits heating any sort of liquid.

What is claimed is:

1. In an accessory for the preparation of a creamy air-milk-steam emulsion to produce cappuccino, adapted to be mounted on the end of an outlet pipe for steam (2) of an espresso coffee machine and comprising an aspiration chamber (3) communicating with the steam outlet pipe (2), a first lateral opening (4) adapted to communicate with a receptacle containing milk, a second lateral opening (5) communicating with the atmosphere, and a third opening (6) through which leaves a first mixture which flows into an emulsion chamber (7) comprising a first flow means (8) through which escapes said creamy emulsion; the improvement wherein the accessory further comprises a first rigid tubular member (9) having an upper end, a base (11), an internal wall (18), the first opening (4) and the first flow means (8), and in which is partially sunk a second flexible tubular member (10) having an upper end and a lower end, said second flexible tubular member adapted to be connected at its upper end to said steam outlet pipe (2) and comprising the aspiration chamber (3) which thus becomes connected to the first opening (4) and the second opening (5), the space remaining between the lower end of the second flexible tubular member (10) and the base (11) of the first rigid tubular member (9) comprising said emulsion chamber (7).

2. Accessory for the preparation of a creamy emulsion, according to claim 1, wherein the first lateral opening (4) of the first rigid tubular member (9) is in communication with the aspiration chamber (3) via a hole (13) transverse to an axis XX' of said accessory provided in said second flexible tubular member (10).

3. Accessory for the preparation of a creamy emulsion, according to claim 2, wherein the internal wall (18) of the rigid member (9) comprises a shoulder (10') against which comes into abutment the lower end of the flexible member (10), such that the transverse hole (13) opens into a circular throat (12) in the second flexible tubular member (10), whereupon said throat is disposed, after emplacement of the second flexible member (10) in the first rigid member (9), confronting the first opening (4) of the first rigid tubular member (9).

4. Accessory for the production of a creamy emulsion, according to claim 1, wherein the second lateral opening (5) is a calibrated groove disposed parallel to the axis XX' of the accessory and provided in the internal lateral wall (18) of the first rigid tubular member (9) and extending between the upper end of said first rigid tubular member and the first opening (4).

5. Accessory for the production of a creamy emulsion, according to claim 1, wherein the second flexible tubular member (10) comprises a gripping means (14) provided on its upper end.

6. Accessory for the production of a creamy emulsion, according to claim 1, wherein the base (11) of the first rigid tubular member (9) comprises a boss (15) situated facing said third opening (6).

7. Accessory for the production of a creamy emulsion, according to claim 6, wherein the boss (15) has the form of a pointed cone (16).

8. Accessory for the production of a creamy emulsion, according to claim 1, wherein the first flow means (8) of the first rigid tubular member (9) opens into at least one anti-splash chamber (19) integral with the first rigid tubular member (9) and comprising, in an upper portion of the chamber (19), a hole for the evacuation of steam (21) and, in a lower portion, an opening (20) for evacuation of the creamy emulsion.

9. Accessory for the preparation of a creamy emulsion, according to claim 1, wherein the first rigid tubular member (9) is of polyacetaldehyde and the second flexible tubular member (10) is of silicone.

* * * * *